(12) United States Patent
Azdasht

(10) Patent No.: US 10,081,068 B2
(45) Date of Patent: Sep. 25, 2018

(54) DEVICE FOR THE SEPARATE APPLICATION OF SOLDER MATERIAL DEPOSITS

(71) Applicant: PAC TECH-PACKAGING TECHNOLOGIES GMBH, Nauen (DE)

(72) Inventor: Ghassem Azdasht, Berlin (DE)

(73) Assignee: PAC TECH—PACKAGING TECHNOLOGIES GMBH, Nauen (DE)

( * ) Notice: Subject to any disclaimer, the term of this patent is extended or adjusted under 35 U.S.C. 154(b) by 107 days.

(21) Appl. No.: 15/035,428

(22) PCT Filed: Oct. 23, 2014

(86) PCT No.: PCT/EP2014/072733
§ 371 (c)(1),
(2) Date: May 9, 2016

(87) PCT Pub. No.: WO2015/090687
PCT Pub. Date: Jun. 25, 2015

(65) Prior Publication Data
US 2016/0279725 A1 Sep. 29, 2016

(30) Foreign Application Priority Data
Dec. 19, 2013 (DE) .................. 10 2013 114 447

(51) Int. Cl.
*B23K 1/005* (2006.01)
*B23K 3/06* (2006.01)
*B23K 26/354* (2014.01)

(52) U.S. Cl.
CPC .......... *B23K 1/0056* (2013.01); *B23K 3/0623* (2013.01); *B23K 26/354* (2015.10)

(58) Field of Classification Search
CPC .. B23K 1/0053; B23K 1/0056; B23K 26/032; B23K 26/034; B23K 26/0626; B23K 26/354; B23K 3/0623
(Continued)

(56) References Cited

U.S. PATENT DOCUMENTS 5,977,512 A  11/1999  Ghassem et al.
6,152,348 A  11/2000  Finn et al.
(Continued)

FOREIGN PATENT DOCUMENTS

CN  101152680 A  4/2008
CN  101246008 A  8/2008
(Continued)

OTHER PUBLICATIONS

Korean Intellectual Property Office, Notice of Rejection, Application No. 10-2016-7014402, dated May 8, 2017.
(Continued)

*Primary Examiner* — Christopher Kim
(74) *Attorney, Agent, or Firm* — Quarles & Brady LLP

(57) ABSTRACT

The invention relates to a device (10) for the separate application of solder material deposits (11), in particular solder balls, comprising a conveying device (19) for separately conveying the solder material deposits from a solder material reservoir (12) toward an application device (33), the conveying device having transport holders that are formed as passage holes and that can each be moved from a receiving position, in which a solder material deposit is received from the solder material reservoir, into a transfer position P2, in which the solder material deposit is exposed to a pressure gas and from which the solder material deposit is transferred to an application opening (37) of an application nozzle (36) of the application device into an application position P3, wherein a first detector device (69) for trigger-
(Continued)

ing a treatment of the solder material deposit arranged in the application position P3 with laser radiation emitted by a laser device and a second detector device (80) for locating the solder material deposit are provided.

8 Claims, 4 Drawing Sheets

(58) Field of Classification Search
USPC .............. 219/121.6–121.62, 121.65, 121.83, 219/121.85
See application file for complete search history.

(56) References Cited

U.S. PATENT DOCUMENTS

| | | | |
|---|---|---|---|
| 6,336,581 B1* | 1/2002 | Tuchiya | B23K 3/0615 228/245 |
| 6,769,599 B1 | 8/2004 | Momeni et al. | |
| 2005/0031776 A1 | 2/2005 | Zakel et al. | |
| 2007/0131661 A1 | 6/2007 | Reiber | |
| 2010/0089981 A1 | 4/2010 | Matsumoto et al. | |
| 2013/0256277 A1* | 10/2013 | Li | B23K 1/0016 219/74 |
| 2016/0354853 A1* | 12/2016 | Azdasht | B23K 1/0056 |

FOREIGN PATENT DOCUMENTS

| | | |
|---|---|---|
| CN | 102085590 A | 6/2011 |
| CN | 202114398 U | 1/2012 |
| CN | 103358020 A | 10/2013 |
| CN | 203936498 U | 11/2014 |
| DE | 42 00 492 | 4/1993 |
| DE | 195 41 996 | 5/1997 |
| DE | 195 44 929 | 6/1997 |
| DE | 198 38 532 | 4/1999 |
| DE | 102 57 173 | 6/2004 |
| JP | H11 114737 | 4/1999 |
| JP | H11514933 A | 12/1999 |

OTHER PUBLICATIONS

International Search Report dated Mar. 10, 2015 for International Application No. PCT/EP2014/072733.
PCT English Language Translation of the International Preliminary Report on Patentability, PCT/EP2014/072733, dated Jun. 30, 2016.
State Intellectual Proeprty Office of People's Republic of China, First Office Action and Search Report, Application No. 201480067386.6, dated Feb. 7, 2018.

* cited by examiner

DEVICE FOR THE SEPARATE APPLICATION OF SOLDER MATERIAL DEPOSITS

CROSS-REFERENCE TO RELATED APPLICATIONS

This application represents the national stage entry of PCT International Application No. PCT/EP2014/072733 filed Oct. 23, 2014 and claims priority to German Patent Application No. 10 2013 114 447.0 filed Dec. 19, 2013. The contents of this application are hereby incorporated by reference as if set forth in their entirety herein.

The invention relates to a device for the separate application of solder material deposits, in particular solder balls, comprising a conveying device for separately conveying the solder material deposits from a solder material reservoir toward an application device, the conveying device having transport holders that are formed as passage holes and that can each be moved from a receiving position P1, in which a solder material deposit is received from the solder material reservoir, into a transfer position P2, in which the solder material deposit is exposed to a pressure gas and from which the solder material deposit is transferred to an application opening of an application nozzle of the application device into an application position P3.

A device of the kind mentioned in the introduction is known from DE 195 41 996 A1. Said device has a detector device for triggering a treatment of the solder material deposit arranged in the application position, said detector device being realized as a pressure sensor. The pressure sensor detects a positive pressure forming in the application duct, said positive pressure occurring when the application opening is closed by a solder material deposit arranged in the application position P3. Controlled by the pressure sensor, the laser treatment is triggered upon achieving a defined switching pressure when a solder material deposit is located in the application position P3 and blocks the application opening.

When the known device is in use, a clear application position of the solder material forms in that the solder material deposit bears against the terminal surface of a substrate, which is to be provided with the solder material deposit, even prior to the treatment with laser radiation so that the application opening is blocked and the pressure sensor provides a corresponding sensor output signal to trigger the laser treatment. The detector device formed as a pressure sensor of the known device serves to both trigger the laser treatment and to locate the solder material deposit. This means that in any case the detector device of the known device offers only information on whether a solder material deposit is located in the application position and whether the laser treatment of the solder material can thus take place.

It is the object of the present invention to propose a device of the aforementioned kind that allows a more precise control of the laser treatment.

To this end, the device according to the invention exhibits the features of claim 1.

According to the invention, the device is provided with a first detector device for triggering a treatment of the solder material deposit arranged in the application position P3 with laser radiation emitted by a laser device and is provided with a second detector device for locating the solder material deposit.

The provision of a second detector device that offers information on the position of the solder material deposit independently of a first detector device, in addition to the first detector device that serves to trigger the laser treatment, allows a more precise control of the laser treatment because the manner in which the laser treatment takes place can thus be implemented as a function of the position of the solder material deposit.

Contrary to the known device, in which a pressure sensor is used to trigger the laser treatment, a preferred embodiment of the device according to the invention uses a reflection sensor in the first detector device, which is realized as an optical sensor device, said reflection sensor detecting the reflection radiation reflected by the solder material deposit so that the laser device, which is used anyway as an energy source for treating the solder material deposit with melting energy, simultaneously provides the medium, namely the laser radiation, so as to allow detection of the solder material deposit with the aid of the optical sensor. As the second detector device, a pressure sensor is used, which, however, does not serve to trigger the laser treatment but to locate the solder material deposit in such a manner that a high pressure output signal of the pressure sensor provides information that the solder material deposit is blocking the application opening, i.e. is still positioned within the application device, whereas a low pressure output signal of the pressure sensor provides information that the application opening is free, i.e. the solder material deposit is already located in a position on a terminal surface of a substrate.

When the device according to the invention is in operation, a laser device having at least two power settings is operated, a so-called pilot beam of relatively low energy density being emitted on a first power setting, said pilot beam allowing reflection radiation to form when hitting a solder material deposit arranged in the application opening, which is detected by the reflection sensor. If then it is clear due to the detection of the reflection radiation by the reflection sensor that a solder material deposit is located in the application position P3, the solder material deposit is treated with laser radiation of substantially higher power density on a second power setting of the laser device, said laser radiation allowing the solder material deposit to at least partially melt and, thus, the solder material deposit to be expelled from the application device by means of pressure gas. Since the opening is released, a pressure drop occurs that can be detected by the pressure sensor and that defines the exact time of release of the application opening, thus making it possible, for example, to ascertain the correlation between the laser power and the time of application on the terminal surface.

It is also particularly advantageous if in addition to the reflection sensor, which detects the reflection radiation reflected by the solder material deposit arranged in the application opening of the application nozzle, the first detector device has an optical temperature sensor that detects the infrared radiation emitted by the solder material deposit. By integrating the optical temperature sensor into the detector device, the latter cannot only serve to trigger the laser treatment of the solder material deposit by the laser device, but also to ascertain the temperature of the solder material deposit. The temperature of the solder material deposit allows optimizing the adjustment of the parameters of the laser device in particular on the basis of an empirically ascertained correlation between the temperature of the solder material deposit and its melting state. If the corresponding temperature output signal is now superimposed with the pressure output signal of the pressure sensor of the second detector device, the application of pressure gas for expelling the solder material deposit from the application opening can take place as a function of the temperature, i.e. of the melting state, of the solder material deposit, for example.

An optimized setting of the laser device in situ, i.e. during operation of the device, can take place in particular if the temperature sensor is connected to a control device of the laser device in such a manner that the control device controls the operation of the laser device as a function of an output signal of the temperature sensor. Thus, the power of the laser device can be reduced in case of an excess temperature of the solder material deposit, for example.

In a preferred embodiment of the invention, the first detector device is realized independently of the application device and is optically connected to the application opening of the application nozzle by means of a coupling device. In this way, it becomes possible to arrange the first detector device independently of the device so that the first detector device does not necessarily have to be realized on the housing of the device. Thus, the housing and in particular the application device can be designed in a comparatively simple fashion.

It proves particularly advantageous if the coupling device serves both to optically connect the application opening and the first detector device and to optically connect the application opening and the laser device so that the structure of the device can be further simplified owing to the multiple function of the coupling device.

If the coupling device is arranged at the upper end of an application duct opposite of the application opening on a top side of an upper housing part of the device and has both a transparent coupling surface for forming an optical connection between the application opening and the laser device and a beam deflection device for deflecting the reflection radiation reflected by the solder material deposit toward the first detector device, the structure of the coupling device is compact on the one hand, and on the other hand the coupling device is arranged in an exposed manner on the top side of the housing so that the first detector device can be freely arranged in the periphery of the device.

A particularly simple structure of the coupling device becomes possible if the coupling surface is formed by the beam deflection device. In particular this double function of the beam deflection device allows the realization of a miniaturized coupling device, which especially facilitates a desirable reduction of the mass of the device.

A particularly compact and simple design of the beam deflection device making possible the double function laid out above can be achieved if the beam deflection device is realized as a semi-transparent mirror that is arranged at an angle of 45° to the optical axis between the laser device and the application opening.

Figure 1:
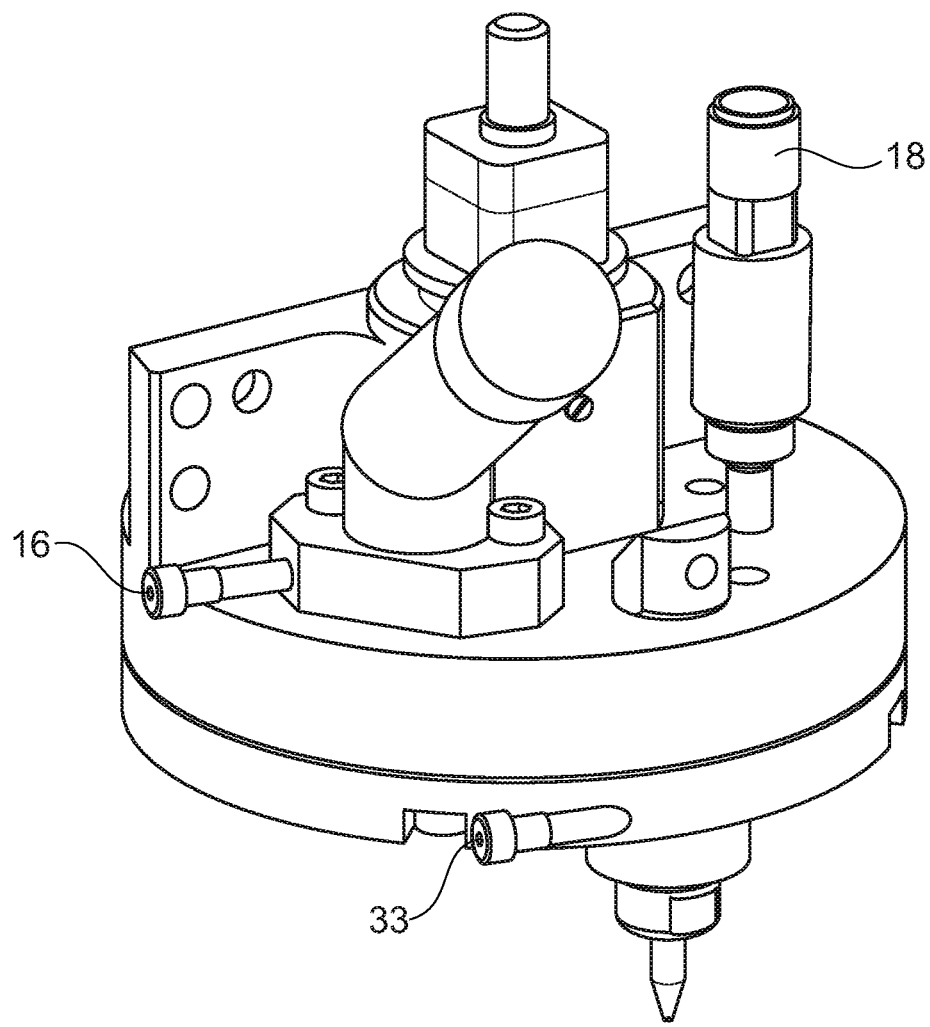
FIG. 1 shows a device for the separate application of a solder material deposit in an isometric illustration.
Figure 2:
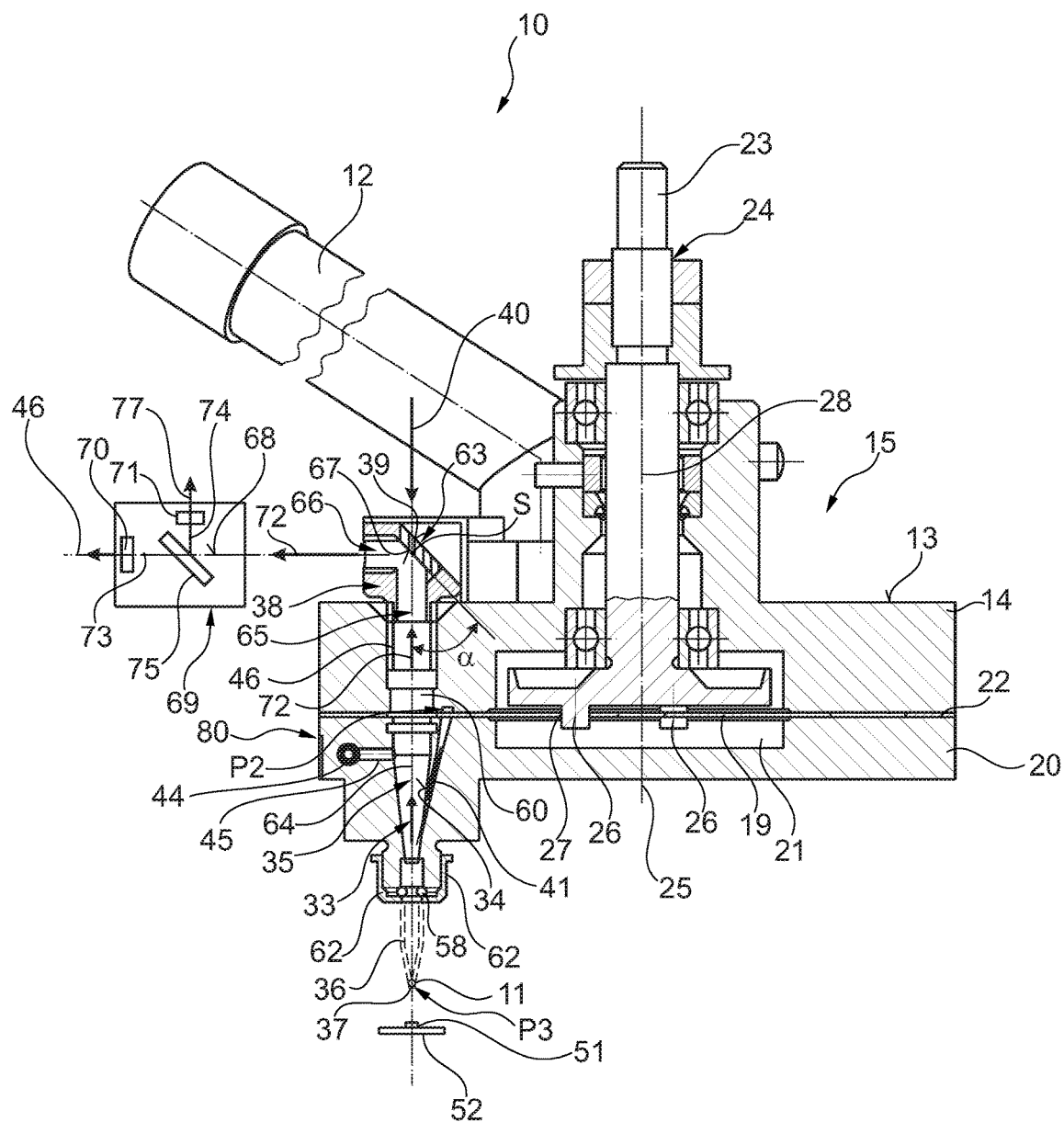
FIG. 2 shows the device illustrated in FIG. 1 in a sectional illustration.

In FIGS. 1 and 2, a device 10 for the separate application of solder material deposits 11 is illustrated, the solder material deposits 11 in the present case being realized as solder material balls that are held for provisioning in a solder material reservoir 12 that is arranged on a top side 13 of an upper housing part 14 of a device housing 15. In the upper housing part 14, a solder material duct 17 is formed below a connection opening 16 (FIG. 4), said solder material duct 17 allowing solder material deposits 11 to travel, as illustrated in FIG. 1, from the solder material reservoir 12 into transport holders 18 (FIG. 3) formed as passage holes of a conveying device 19 that is formed as a circular conveying disk and that is received between the upper housing part 14 and a lower housing part 20 in a circular conveying space 21. To form the circular conveying space 21, a housing ring 22 is arranged concentrically with respect to the conveying device 19 between the upper housing part 14 and the lower housing part 20.

Figure 3:
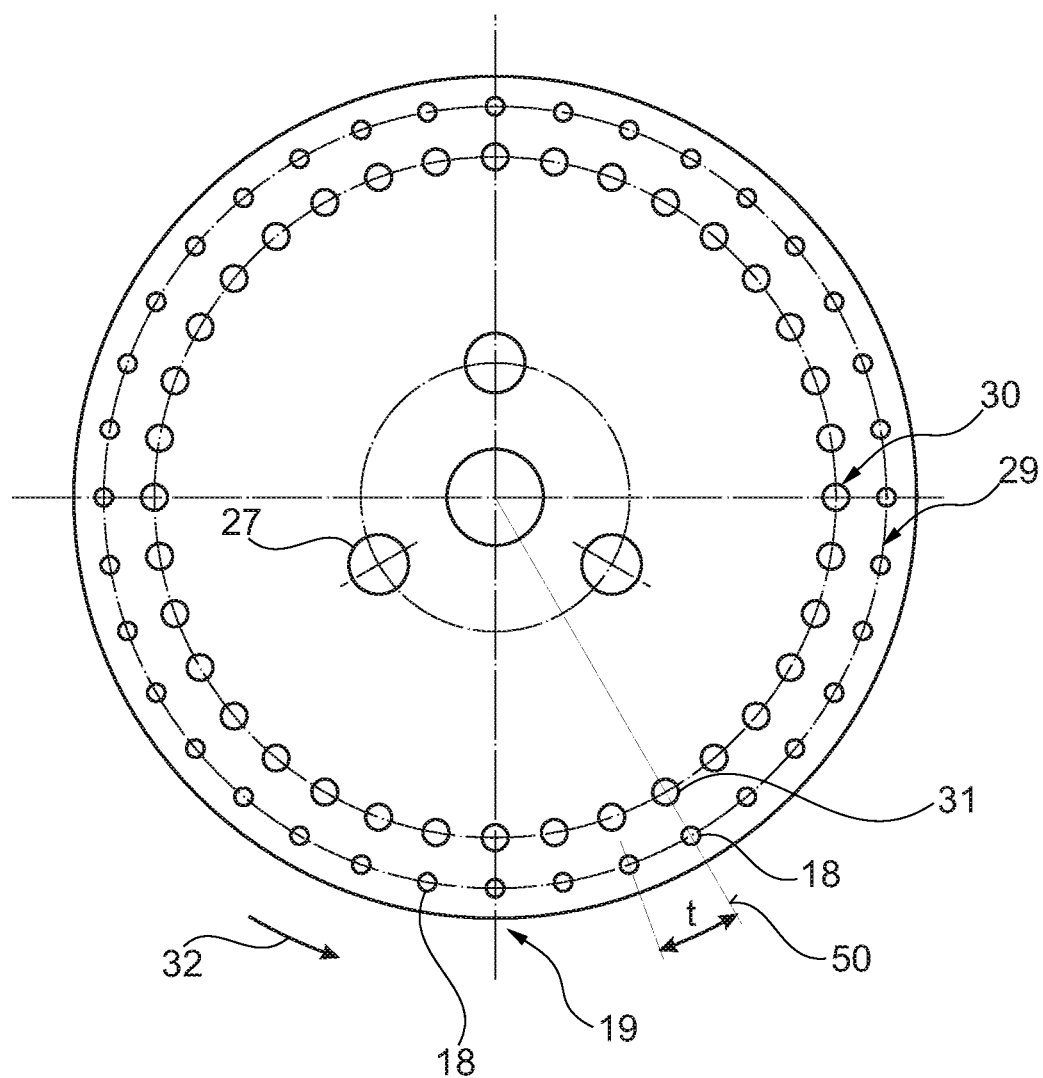
FIG. 3 shows a conveying device of the device illustrated in FIG. 2 in a top view.

In the upper housing part 14, a conveying shaft 24 is located that can be coupled with a motor drive (not illustrated) at its input end 23 and that allows a rotary drive of the conveying device 19 about a rotation axis 28 via drive pins 26 that are arranged at its output end 25 and engage into engagement openings 27 of the conveying device 19 illustrated in FIG. 3.

As FIG. 3 shows, in addition to the transport holders 18, which are arranged equidistantly on a conveying circle 29 of the conveying device 19, the conveying device 19 has a control circle 30 that is arranged concentrically and within the conveying circle 29 in the present case and that has control bores 31 on a common radial axis 50 with the transport holders 18 in each case. Said control bores 31 interact with a light barrier device (not illustrated) arranged in the device housing 15 and permit control of a clocked circular conveying motion of the conveying device 19 about the rotation axis 28 in such a manner that, in the conveying direction 32 of the conveying device 19, the transport holders 18 are moved forward out of a receiving position P1 below the solder material duct 17 connected to the solder material reservoir 12 each time by a graduation t of the conveying circle 29 in the conveying direction 32 and arrive in a transfer position P2 in which the transport holders 18 are located in a coaxial or flush arrangement with respect to a supply duct 41 that is formed in the lower housing part 20, extends from the transfer position P2 to the application device 33 and ends with a discharge end 34 in an application duct 35 of the application device 33.

As shown in FIG. 2, the application device 33 has, on its lower end, an application nozzle 36 that is arranged in an exchangeable manner on the lower housing part 20 and comprises an application opening 37 which, in the present case, has a diameter that is smaller than the diameter of the solder material deposits 11 so that a solder material deposit 11 transferred from the transfer position P2 to the application nozzle 36 comes to bear against an opening edge of the application opening 37 in an application position P3. In the present case, the application nozzle 36 is screwed to the lower housing part 20 by means of a cap nut 62, the connection of the application nozzle 36 to the lower housing part 20 comprising a seal 58 so as to be sealed against the lower housing part 20.

At the upper end of the application duct 35, a coupling device 38 is arranged at the top side 13 of the device housing 15, said coupling device 38 being provided with a transparent coupling surface 39. Via the coupling surface 39, the solder material deposit 11 arranged in the application position P3 can be treated with laser radiation 40, which is emitted by a laser device (not illustrated).

In the present case, the coupling surface 39 is formed by a top side of a semi-transparent mirror 63 that is arranged at an angle $\alpha=45°$ on an optical axis 64 that extends between the application opening 37 and the laser device (not illustrated) emitting the laser radiation 40.

In the configuration of the device illustrated in FIG. 2, a solder material deposit 11 is located at the application opening 37 in the application position P3. The solder material 11 bears against an inner opening edge of the application opening 37.

As FIG. 2 shows, the coupling device 38, which is arranged at the upper end of the application duct 35 opposite of the application opening 37 on the top side 13 of the upper housing part 14, has a radiation duct 65 that is arranged coaxially to the optical axis 64 and a reflection duct 66 that is arranged vertically to the optical axis 64. The semi-transparent mirror 63 is arranged with a reflection surface 67, which here is formed by the bottom side of the mirror 63, in a point of intersection S of the reflection duct 66 and the radiation duct 65. On a reflection axis 68 that is arranged at a reflection angle $\beta=90°$ to the optical axis, a detector device 69 is provided that has a reflection sensor 70 and a temperature sensor 71 and that is realized independently of the device housing 15 in the present case.

If the solder material deposit 11 arranged in the application position P3 is treated with laser radiation 40 emitted by the laser device, the laser radiation 40 is at least partially reflected at the surface of the solder material deposit 11 so that reflection radiation 72 reflected by the solder material 11 is reflected onto the reflection surface 67 of the semi-transparent mirror 63, and from there it travels along the reflection axis 68 to the detector device 69, where the reflection beam 72 is separated into a reflection sensor beam 73 hitting the reflection sensor 70 and a temperature sensor beam 74 hitting the temperature sensor 71 by means of a beam separator, which is also realized as a semi-transparent mirror 75 in the present case.

When the device is in operation, the laser device is operated on two power settings in such a manner that on a first power setting, the laser radiation 40 is emitted as a pilot beam of relatively low energy density, said pilot beam being reflected as reflection radiation 72 by the solder material deposit 11 that is arranged in the application position P3 and hitting the reflection sensor 70 as a reflection sensor beam 73.

If it is clear from the detection of the reflection radiation 72 by the reflection sensor 70 that a solder material deposit 11 is located in the application position P3, the laser device is switched, triggered by an output signal 76 of the reflection sensor, to the second power setting, on which the laser radiation 40 is emitted as a power radiation of increased energy density. The power radiation causes the solder material deposit 11 to melt at least partially, the portion of infrared radiation contained in the reflection radiation 72 being detected by the temperature sensor 71 and a corresponding output signal 77 of the temperature sensor being generated. The output signal 77 of the temperature sensor allows the temperature of the solder material deposit 11 to be ascertained so that the output signal 77 of the temperature sensor can be used, for example, to adjust the power and/or a pulse duration of the laser radiation 40 in such a manner that the desired temperature and the desired melting state of the solder material deposit 11 is achieved.

The solder material deposit 11, which has been at least partially melted because of the laser treatment, is thrown out through the application opening 37 by means of an application of pressure gas via the supply duct 41 ending in the application duct 35 and is applied against a contact surface 51 of a substrate 52.

For example, the application of pressure gas can take place as a function of the fact that the application of pressure gas is triggered after detection of a solder material deposit in the application position P3 by the reflection sensor 70 and after expiry of a predefined period of time in which the solder material deposit 11 is treated with power radiation.

Of course, it is also possible to operate the device in such a manner that the application of pressure gas takes place as a function of the fact that a defined melting state of the solder material deposit 11 is detected via the temperature sensor 71.

Figure 4:
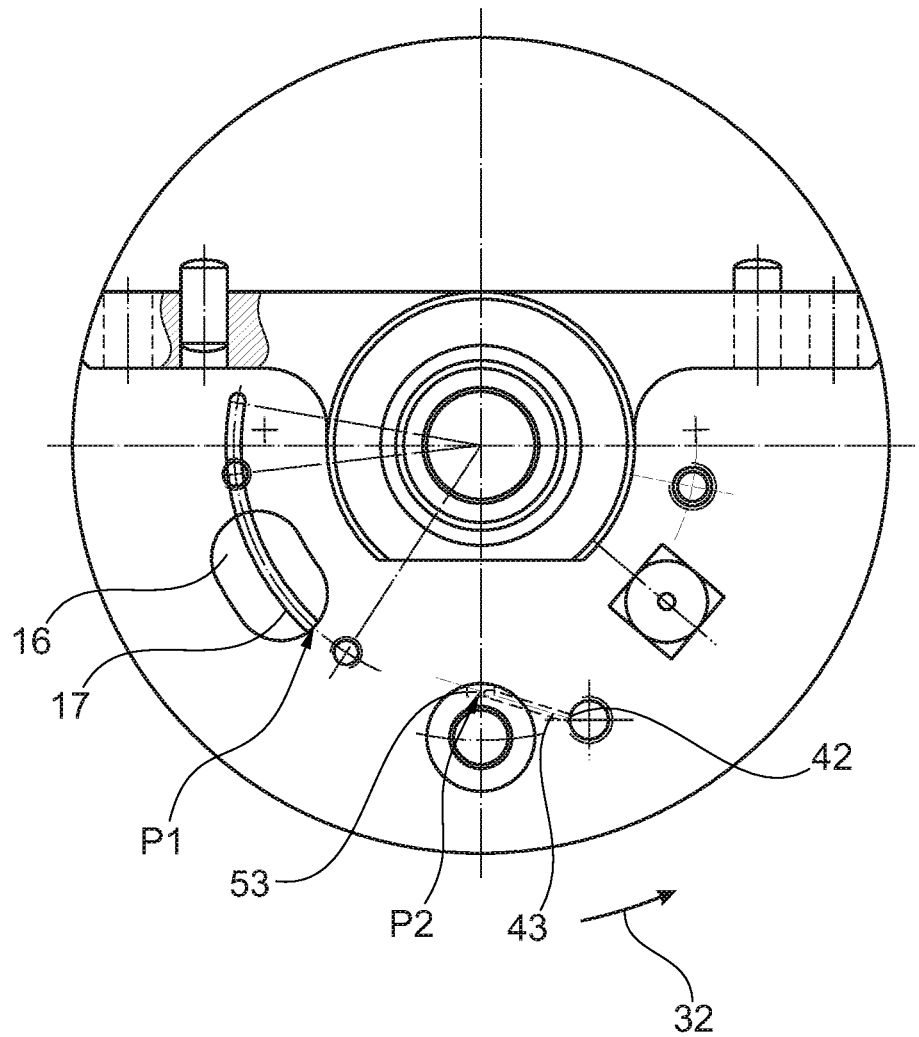
FIG. 4 shows a top view of a device housing of the device illustrated in FIGS. 1 and 2.

For the application of pressure gas, the upper housing part 14 comprises a pressure gas connection 42 illustrated in FIGS. 1 and 4, which is connected via a pressure gas duct 43 to a solder material deposit receiving space 53 formed in the upper housing part 14 above the transfer position P2 opposite of the upper end of the supply duct 41 formed in the lower housing part 20. By means of the application of pressure gas to the solder material deposit 11 arranged in the solder material deposit receiving space 53, the solder material deposit 11 is also transferred into the application position P3 at the application opening 37 of the application nozzle.

As FIG. 2 further shows, in addition to the first detector device 69, a second detector device 80 is provided, which has a pressure sensor 44 that is connected via a pressure bore 45 to a pressure chamber 61 that is defined in the application duct 35 of the application device 33 between the application opening 37 and a transparent gas-tight screen 60 that is arranged at a lower axial end of a housing 46 of the coupling device 38. The pressure sensor 44 detects a pressure drop forming in the pressure chamber 61, which occurs when the application opening 37 is free again after the solder material deposit 11, which has been at least partially melted by the laser treatment, is expelled, i.e. when the solder material deposit 11 is no longer located in the application position P3 but in its contact position on the contact surface 51 of the substrate 52.

As a function of the thus provided information on the position of the solder material deposit 11, now a new laser treatment of the solder material deposit 11 can take place, a treatment with the pilot beam and an evaluation of the output signal 76 of the reflection sensor generated by the first detector device 69 allowing conclusions as to the surface shape of the solder material deposit 11 connected to the contact surface 51 because the reflection behavior of a concave surface is different from the reflection behavior of a convex surface. In principle, the portion of the reflection radiation 72 that travels from a concave surface of the solder material deposit 11 through the application opening 37 back to the detector device 69 is smaller than the portion of the reflection radiation 72 that travels from a convex surface of the solder material deposit 11 through the application opening 37 back to the detector device 69.

The information obtained on the surface shape of the solder material deposit 11 applied to the contact surface 51 can be used to change the laser power on the second power setting, i.e. when the power beam for melting the solder material deposit 11 arranged in the application position P3 in the application opening 37 is emitted, in such a manner that the desired surface shape of the solder material deposit 11 applied to the contact surface in the contact position after expulsion of the solder material deposit 11 from the application opening 37 is achieved.

The invention claimed is:

1. A device for the separate application of solder material deposits to a contact position on a contact surface of a substrate, said device comprising:
   a conveying device separately conveying solder material deposits from a solder material reservoir toward an application device, the conveying device having transport holders formed as passage holes that can each be moved from a receiving position P1, in which a solder material deposit is received from the solder material reservoir, into a transfer position P2, in which the solder material deposit is exposed to a pressure gas and from which the solder material deposit is transferred to an application opening of an application nozzle of the application device into an application position P3;

a first detector device triggering a treatment of the solder material deposit arranged in the application position P3 with laser radiation emitted by a laser device; and a second detector device locating the solder material deposit in which the first detector device is an optical sensor device including a reflection sensor that detects reflection radiation reflected by the solder material deposit in the application position P3 as well as in the contact position of the solder material deposit, the contact position being different from the application position P3 and the second detector device has a pressure sensor that measures gas pressure in a pressure chamber formed in the application device between a transport holder arranged in the transfer position P2 and the application opening of the application nozzle by which, in the event of a pressure drop in the pressure chamber, a transition of the solder material deposit from the application position P3 to the contact position is signaled to a control unit of the laser device.

2. The device according to claim 1, in which in addition to the reflection sensor that detects the reflection radiation reflected by the solder material deposit arranged in the application opening of the application nozzle, the first detector device has an optical temperature sensor that detects infrared radiation emitted by the solder material deposit.

3. The device according to claim 1, in which a temperature sensor is connected to a control device of the laser device in such a manner that the control device controls the operation of the laser device as a function of an output signal of the temperature sensor.

4. The device according to claim 1, in which the first detector device is independent of the application device and is optically connected to the application opening-of the application nozzle by a coupling device.

5. The device according to claim 4, in which the coupling device serves both to optically connect the application opening and the first detector device and to optically connect the application opening and the laser device.

6. The device according to claim 5, in which the coupling device is arranged at an upper end of an application duct opposite of the application opening on a top side of an upper housing part of the device and has both a transparent coupling surface forming an optical connection between the application opening and the laser device and a beam deflection device for deflecting the reflection radiation toward the first detector device.

7. The device according to claim 6, in which the coupling surface is formed by the beam deflection device.

8. The device according to claim 7, in which the beam deflection device is a semi-transparent mirror arranged at an angle of approximately 45° to an optical axis between the laser device and the application opening.

* * * * *

UNITED STATES PATENT AND TRADEMARK OFFICE
CERTIFICATE OF CORRECTION

PATENT NO. : 10,081,068 B2
APPLICATION NO. : 15/035428
DATED : September 25, 2018
INVENTOR(S) : Azdasht Page 1 of 1

It is certified that error appears in the above-identified patent and that said Letters Patent is hereby corrected as shown below:

On the Title Page

Item (*) Notice:, the following sentence should be included after the first paragraph
--This patent is subject to a terminal disclaimer.--.

Item (45) Date of Patent:, "Sep. 25, 2018" should be --*Sep. 25, 2018--.

Signed and Sealed this
Eleventh Day of December, 2018

Andrei Iancu
*Director of the United States Patent and Trademark Office*